US012340790B2

United States Patent
Gonzalez

(10) Patent No.: US 12,340,790 B2
(45) Date of Patent: *Jun. 24, 2025

(54) DYNAMIC TEMPERED SAMPLING IN GENERATIVE MODELS INFERENCE

(71) Applicant: Google LLC, Mountain View, CA (US)

(72) Inventor: Pablo Barrera Gonzalez, Mountain View, CA (US)

(73) Assignee: Google LLC, Mountain View, CA (US)

(*) Notice: Subject to any disclaimer, the term of this patent is extended or adjusted under 35 U.S.C. 154(b) by 178 days.

This patent is subject to a terminal disclaimer.

(21) Appl. No.: 18/194,829

(22) Filed: Apr. 3, 2023

(65) Prior Publication Data

US 2023/0237986 A1    Jul. 27, 2023

Related U.S. Application Data

(63) Continuation of application No. 16/718,333, filed on Dec. 18, 2019, now Pat. No. 11,620,979.

(51) Int. Cl.
*G10L 13/047* (2013.01)
*G06N 3/04* (2023.01)
(Continued)

(52) U.S. Cl.
CPC .............. *G10L 13/047* (2013.01); *G06N 3/04* (2013.01); *G10L 13/00* (2013.01); *G10L 19/005* (2013.01); *G10L 25/30* (2013.01)

(58) Field of Classification Search
None
See application file for complete search history.

(56) References Cited

U.S. PATENT DOCUMENTS 10,127,918 B1 * 11/2018 Kamath Koteshwara ...................
................................................. G11B 27/038
10,546,066 B2 * 1/2020 Li ............................. G06N 3/08
(Continued)

FOREIGN PATENT DOCUMENTS

WO    2019213021 A1    11/2019

OTHER PUBLICATIONS

Marco Lippi, Marcelo A. Montemurro, Mirko Degli Esposti, and Giampaolo Cristadoro; Natural Language Statistical Features of LSTM-Generated Texts; Nov. 2019; URL: https://ieeexplore.ieee.org/stamp/stamp.jsp?arnumber=8681285 (Year: 2019).*

(Continued)

*Primary Examiner* — Richa Sonifrank
(74) *Attorney, Agent, or Firm* — Honigman LLP; Brett A. Krueger

(57) ABSTRACT

A method of sampling output audio samples includes, during a packet loss concealment event, obtaining a sequence of previous output audio samples. At each time step during the event, the method includes generating a probability distribution over possible output audio samples for the time step. Each sample includes a respective probability indicating a likelihood that the corresponding sample represents a portion of an utterance at the time step. The method also includes determining a temperature sampling value based on a function of a number of time steps that precedes the time step, and an initial, a minimum, and a maximum temperature sampling value. The method also includes applying the temperature sampling value to the probability distribution to adjust a probability of selecting possible samples and randomly selecting one of the possible samples based on the adjusted probability. The method also includes generating synthesized speech using the randomly selected sample.

20 Claims, 9 Drawing Sheets

(51) Int. Cl.
*G10L 13/00* (2006.01)
*G10L 19/005* (2013.01)
*G10L 25/30* (2013.01)

(56) References Cited

U.S. PATENT DOCUMENTS

| | | | |
|---|---|---|---|
| 2017/0011738 A1* | 1/2017 | Senior | G10L 15/063 |
| 2019/0205748 A1* | 7/2019 | Fukuda | G06N 3/044 |
| 2019/0244604 A1* | 8/2019 | Masataki | G10L 15/183 |
| 2019/0362229 A1* | 11/2019 | Norouzi | G06N 3/045 |
| 2020/0035223 A1* | 1/2020 | Asami | G10L 15/06 |
| 2020/0160843 A1* | 5/2020 | Shillingford | G10L 15/24 |
| 2021/0073438 A1* | 3/2021 | Akiyama | G06N 99/00 |
| 2021/0082399 A1* | 3/2021 | Kurata | G10L 15/34 |
| 2021/0117786 A1* | 4/2021 | Schwarz | G06N 3/045 |
| 2022/0001078 A1* | 1/2022 | Siondalski | A61L 27/20 |
| 2023/0237986 A1* | 7/2023 | Gonzalez | G06N 3/04 |
| | | | 704/262 |

OTHER PUBLICATIONS

International Search Report and Written Opinion for the related International Application No. PCT/US2020/065638, Dated Apr. 16, 2021, 14 pages.

Bong-Ki Lee et al: "Packet loss concealment based on deep neural networks for digital speech transmission", IEEE/ACM Transactions on Audio, Speech, and Language Processing, IEEE, USA, vol. 24, No. 2, Feb. 1, 2016 (Feb. 1, 2016), pp. 378-387, XP058261778,ISSN: 2329-9290, DOI: 10.1109/TASLP.2015.2509780, 10 pages.

Sercan O Arik et al: "Deep Voice: Real-time Neural Text-to-Speech", Feb. 24, 2017, XP055489867, Retrieved from the Internet:URL:https://arxiv.org/pdf/1702. 07825.pdf., 17 pages.

* cited by examiner

DYNAMIC TEMPERED SAMPLING IN GENERATIVE MODELS INFERENCE

CROSS REFERENCE TO RELATED APPLICATIONS

This U.S. patent application is a continuation of, and claims priority under 35 U.S.C. § 120 from, U.S. patent application Ser. No. 16/718,333, filed on Dec. 18, 2019. The disclosure of this prior application is considered part of the disclosure of this application and is hereby incorporated by reference in its entirety.

TECHNICAL FIELD

This disclosure relates to dynamic tempered sampling in generative models inference.

BACKGROUND

Regressive generative models may be used for packet loss concealment, which is a technique for masking the effects of packet loss in voice over Internet Protocol (VoIP) communications. These models receive a sequence of audio samples and can infer the next audio samples in the sequence directly or, alternatively, infer a probability density function that provides a relative likelihood for each of a plurality of audio samples that the corresponding audio sample is the next audio sample in the sequence. Probability density functions can be sampled in a number of ways, including direct sampling, mean sampling, mode sampling, and tempered sampling.

SUMMARY

One aspect of the disclosure provides a method of sampling output audio samples. The method includes, during a packet loss concealment event in an active voice communication session, obtaining, by data processing hardware, a sequence of previous output audio samples during a time window having a start time and an end time. The end time occurs when the packet loss concealment event commences. At each time step of a plurality of time steps during the packet loss concealment event, the method includes generating, by data processing hardware, using a speech synthesis model, a probability distribution over possible output audio samples for the corresponding time step. Each possible output audio sample in the probability distribution includes a respective probability indicating a likelihood that the corresponding possible output audio sample represents a portion of an utterance at the corresponding time step. The method also includes determining, by the data processing hardware, a temperature sampling value based on a function of a number of time steps in the plurality of time steps that precedes the corresponding time step, an initial temperature sampling value, a minimum temperature sampling value, and a maximum temperature sampling value. The method also includes applying, by the data processing hardware, the temperature sampling value to the probability distribution to adjust a probability of selecting possible output audio samples from the probability distribution. The method also includes randomly selecting, by the data processing hardware, one of the possible output audio samples of the probability distribution based on the adjusted probability associated with each of the possible output audio samples and generating, by the data processing hardware, synthesized speech using the randomly selected output audio sample.

Implementations of the disclosure may include one or more of the following optional features. In some implementations, the function is a linear function. In some examples, the maximum temperature sampling value is 0.85. Optionally, the minimum temperature sampling value is 0.25. The initial temperature sampling value may be the same as the minimum temperature sampling value.

Determining the temperature sampling value may include determining the number of time steps in the plurality of time steps that preceded the corresponding time step during the packet loss concealment event and, when the number of time steps satisfies a threshold, increasing the temperature sampling value by a set amount. In some implementations, the threshold a multiple of ten time steps. The set amount may be 0.1. Determining the temperature sampling value, in some examples, includes increasing the temperature sampling value based on the number of time steps in the plurality of time steps preceded the corresponding time step during the packet loss concealment event. Optionally, determining the temperature sampling value further includes, once the temperature sampling value is equal to the maximum temperature sampling value, maintaining the temperature sampling value at the maximum temperature sampling value.

Another aspect of the disclosure provides a system for sampling output audio samples. The system includes data processing hardware and memory hardware in communication with the data processing hardware. The memory hardware stores instructions that when executed on the data processing hardware cause the data processing hardware to perform operation. The operations include, during a packet loss concealment event in an active voice communication session, obtaining a sequence of previous output audio samples during a time window having a start time and an end time. The end time occurs when the packet loss concealment event commences. At each time step of a plurality of time steps during the packet loss concealment event, the operations include generating using a speech synthesis model, a probability distribution over possible output audio samples for the corresponding time step. Each possible output audio sample in the probability distribution includes a respective probability indicating a likelihood that the corresponding possible output audio sample represents a portion of an utterance at the corresponding time step. The operations also include determining a temperature sampling value based on a function of a number of time steps in the plurality of time steps that precedes the corresponding time step, an initial temperature sampling value, a minimum temperature sampling value, and a maximum temperature sampling value. The operations also include applying the temperature sampling value to the probability distribution to adjust a probability of selecting possible output audio samples from the probability distribution. The operations also include randomly selecting one of the possible output audio samples of the probability distribution based on the adjusted probability associated with each of the possible output audio samples and generating synthesized speech using the randomly selected output audio sample This aspect may include one or more of the following optional features. In some implementations, the function is a linear function. In some examples, the maximum temperature sampling value is 0.85. Optionally, the minimum temperature sampling value is 0.25. The initial temperature sampling value may be the same as the minimum temperature sampling value.

Determining the temperature sampling value may include determining the number of time steps in the plurality of time steps that preceded the corresponding time step during the packet loss concealment event and, when the number of time steps satisfies a threshold, increasing the temperature sampling value by a set amount. In some implementations, the threshold a multiple of ten time steps. The set amount may be 0.1. Determining the temperature sampling value, in some examples, includes increasing the temperature sampling value based on the number of time steps in the plurality of time steps preceded the corresponding time step during the packet loss concealment event. Optionally, determining the temperature sampling value further includes, once the temperature sampling value is equal to the maximum temperature sampling value, maintaining the temperature sampling value at the maximum temperature sampling value.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
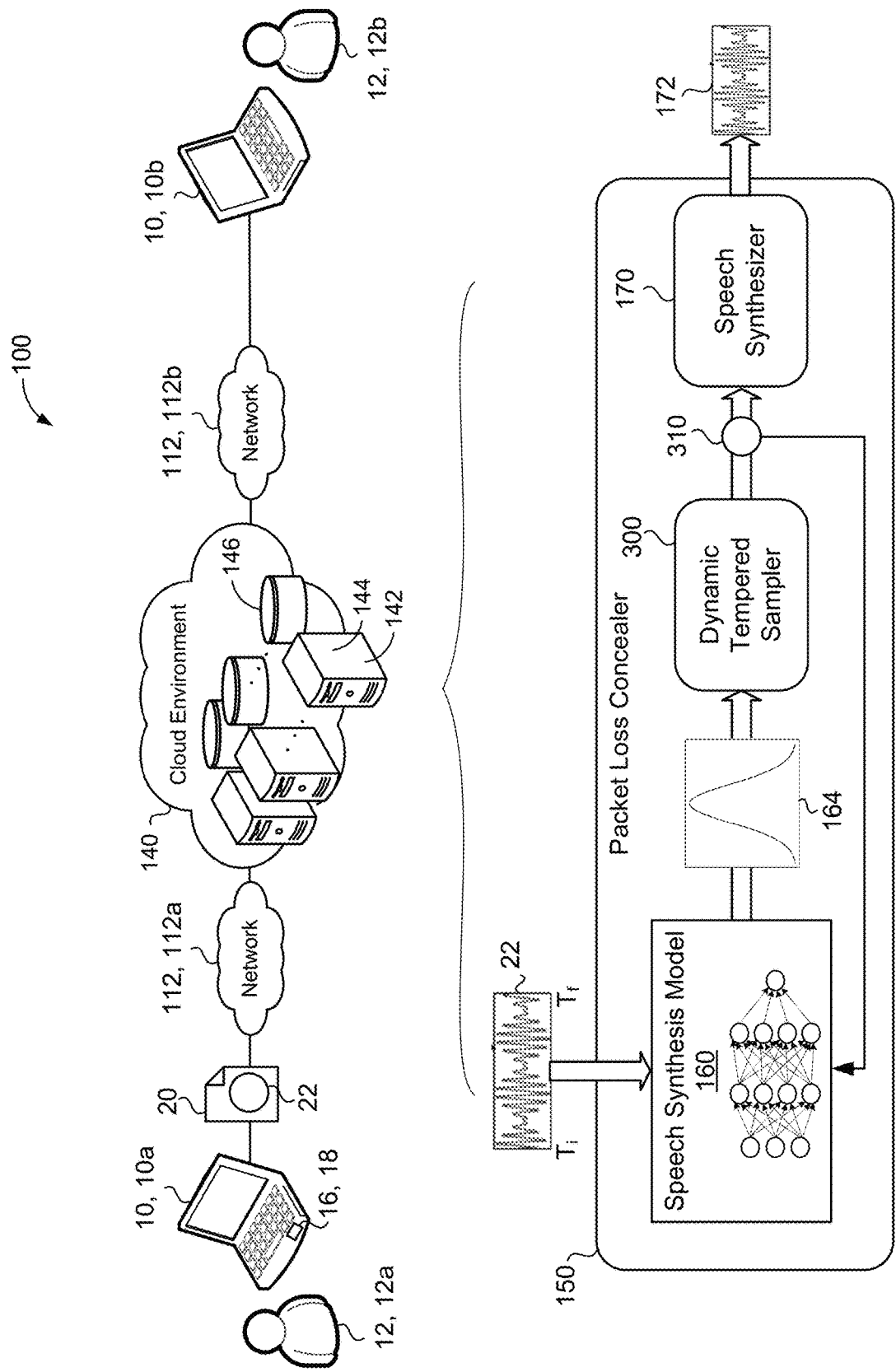
FIG. 1 is a schematic view of an example system for sampling output audio samples.

Packet loss concealment is a technique to mask the effect of packet loss in voice over Internet Protocol (VoIP) communications. In VoIP communications, audio data (i.e., the voice data of the communication between the parties) is typically sent as packets over a Transmission Control Packet/Internet Protocol (TCP/IP) and/or a User Datagram Protocol (UDP) network. These packets are commonly lost, late, or corrupted. When this occurs, the parties experience impaired audio quality. There are a number of different packet loss concealment techniques that attempt to compensate for this packet loss. For example, a zero insertion technique merely replaces the missing packets with all zeros. In this case, the receiving party hears silence in place of the lost packets. Another common technique is waveform substitution that fills in the missing audio data by repeating a portion of speech that was previously received. For example, waveform substitution may just repeat the last received frame. This method is typically effective for short loss events (e.g., a single packet lost), but as the length of the loss event increases, waveform substitution tends to lead to a robotic sounding voice.

Model-based methods, such as regressive generative models, are increasingly being used for packet loss concealment. These models receive a sequence of audio samples and can infer the next audio sample in the sequence directly or, alternatively, infer a probability density function that provides a relative likelihood for each of a plurality of audio samples that the corresponding audio sample is the next audio sample in the sequence. Probability density functions can be sampled in a number of ways, including direct sampling, mean sampling, mode sampling, and tempered sampling. Different sampling techniques have different drawbacks. For example, directly sampling can often introduce artifacts due to the lack of smoothness or focus of the probability density function.

Tempered sampling occurs when the probability density function is weighted or corrected by a sampling temperature value. Sampling temperature modifies or adjusts the probability density function to allow for a better representation of the probability density function. That is, tempered sampling tends to smooth out and focus sampling in the most probable areas. For example, tempered sampling may weight a probability density function $p(x)$ using Equation (1), where $\hat{p}(x)$ is the corrected probability at x, Z is a corrective factor (to ensure that $\hat{p}(x)$ still adds up to 1), and t is a temperature sampling value.

$$\hat{p}(x) = \frac{1}{Z} p(x)^{\frac{1}{t}} \quad (1)$$

The result of Equation (1) is that the higher the temperature sampling value, the closer the adjusted probability density function $\hat{p}(x)$ is to the original probability density function $p(x)$. Conversely, the smaller the temperature sampling value, the more the probability of high probability values are increased and the more the probability of low probability values are decreased. That is, a low temperature sampling value tends to further limit sampling to only the high probability values.

Static or constant tempered sampling (i.e., the temperature sampling value is constant), when applied to packet loss concealment in particular, has significant limitations. For example, a low temperature sampling value tends to eventually collapse the output of the model into silence. That is, frequently, silence will be a high probability option, and a low sampling temperature increases the likelihood that silence is sampled from the probability density function. Because the sampled value is fed back into an autoregressive model to influence the probability density function for the next time step, silence typically continues to be a high probability option. This leads to silence being continually sampled, which is often not desirable for packet loss concealment when speech is present.

Figure 2:
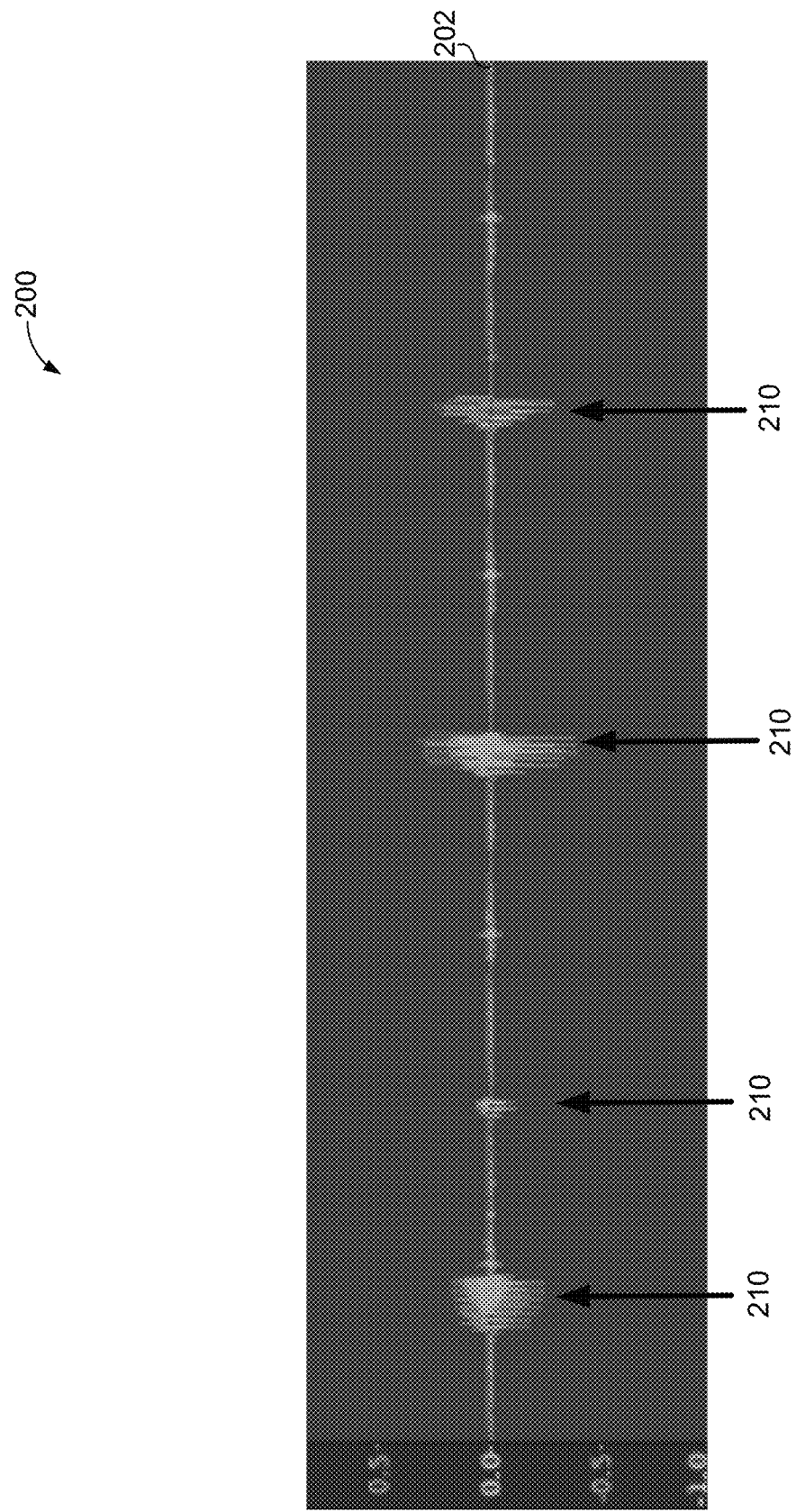
FIG. 2 is a plot of a speech synthesis model generating a babbling output in an absence of speech.

Conversely, a high temperature sampling value tends to result in "babbling" in the output. That is, the model tends to begin generating speech (i.e., talking) in presence of silence (FIG. 2). As expected, this is also not desirable in a packet loss concealment method.

Implementations herein are directed toward a packet loss concealer that generates audio in the absence or delay of incoming audio data during a voice communication session. The packet loss concealer includes a speech synthesis model that generates a probability density function for each time step of a packet loss concealment event. The packet loss concealer also includes a dynamic tempered sampler that samples the probability density function based on a sampling temperature and that dynamically changes the sampling temperature over time to minimize the chances of the model collapsing into silence and to simultaneously minimize the chances of the model babbling during the absence of speech.

Referring to FIG. 1, in some implementations, an example system 100 includes two or more user devices 10, 10a-n, each associated with a respective user 12, 12a-n and each in communication with a remote system 140 via a network 112, 112a-n. The user devices 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware).

The remote system 140 may be a single computer, multiple computers, or a distributed system (e.g., a cloud environment) having scalable/elastic computing resources 144 (e.g., data processing hardware) and/or storage resources 142 (e.g., memory hardware). A data store 146 (i.e., a remote storage device 146) may be overlain on the storage resources 142 to allow scalable use of the storage resources 142 by one or more of the client or computing resources 144. The remote system 140 is configured to receive and transmit a voice data signal, such as that associated with a Voice over Internet Protocol (VoIP) call or a carrier network voice call, between user devices 10, 10a-b through the networks 112, 112a-b. Therefore, a first caller 12a using a first user device 10a may place a phone call or video call to a second user device 10b through remote system 140. The user devices 10, 10a-b communicate by sending a voice data signal through the network 112, 112a-b to the remote system 140. The voice data signal is split into a series packets 20, via, for example, the TCP/IP or UDP protocol, with each packet 20 including one or more audio samples 22 of the audio signal from the respective user device 10, 10a-b.

The remote system 140 executes a packet loss concealer 150. During a packet loss concealment event in an active voice communication session between the first user device 10a and the second user device 10b (i.e., one or more packets 20 have been lost, delayed, or corrupted), the packet loss concealer 150 receives a sequence of previous output audio samples 22 during a time window having a start time $T_i$ and an end time $T_f$. The end time $T_f$ occurs when the packet loss concealment event commences. The start time $T_i$ may be any amount of time before the end time $T_f$. For example, the start time $T_i$ is 280 milliseconds before the end time $T_f$. The start time $T_i$ may be adjusted based upon parameters of the system 100. The greater the start time $T_i$ from the end time $T_f$, in some examples, the more effective the packet loss concealer 150 may be, and the greater the computational resources the packet loss concealer 150 requires. Therefore, the start time $T_i$ may be optimized to balance effectiveness versus computing resources required for the packet loss concealer 150.

A speech synthesis model 160 receives the sequence of previous output audio samples 22. Each sample may correspond to a time step (e.g., 10 milliseconds). The model 160 may be a neural network, e.g., a recurrent neural network (RNN). The model 160 may be an autoregressive generative model that, based on the sequence of previous output audio samples 22, generates a probability distribution 164 over all possible output audio samples for the next sample 22 in the sequence (i.e., the audio sample 22 for the next time step). Each possible output audio sample in the probability distribution 164 includes a respective probability indicating a likelihood that the corresponding possible output audio sample 22 represents a portion of an utterance at the next time step. That is, based on the sequence of previous output audio samples 22, the speech synthesis model 160 predicts a probability for each possible audio sample 22 that the corresponding audio sample 22 will come next in the sequence of audio samples 22. Put another way, the model 160 predicts future speech (that is unavailable due to the packet loss concealment event) based on history of previous speech between the users 12 during the communication. An utterance might include many (e.g., hundreds to thousands) audio samples 22 played consecutively.

The sequence of previous output audio samples 22 may represent the most recent useable audio samples 22. That is, during a packet loss concealment event (i.e., one or more packets 20 and their corresponding audio samples 22 are unavailable), the speech synthesis model 160 may receive the audio samples 22 that immediately preceded the first lost packet 20.

With continued reference to FIG. 1, a dynamic tempered sampler 300 receives the probability distribution 164 from the speech synthesis model 160. The dynamic tempered sampler 300, as discussed in more detail with respect to FIG. 3, randomly selects one of the possible audio output samples 310 of the probability distribution 164 and provides the selected sample 310 to a speech synthesizer 170. The speech synthesizer 170 generates synthesized speech 172 using the randomly selected audio output sample 310. The synthesized speech 172 may be played as the next audio sample in the sequence of audio samples 22 in lieu of the unavailable packet 20 and audio samples 22 that precipitated the packet loss concealment event. The randomly selected audio output sample 310 is also provided back to the speech synthesis model 160 for use in predicting audio samples in subsequent time steps. That is, the speech synthesis model 160 generates a probability distribution 164 for each time step based on the sequence of previous audio samples 22 and any randomly selected audio output samples 310 from previous probability distributions 164 during the same packet loss concealment event. In some examples, the dynamic tempered sampler 300 may pseudo-randomly select one of the possible audio output samples 310 (e.g., by using a fixed seed).

Referring now to FIG. 2, when the probability distribution 164 is sampled with a low and static sampling temperature (i.e., the sampling temperature does not change), the model 160 will likely collapse into silence. Conversely, when the probability distribution 164 is sampled with a high and static sampling temperature, the model 160 will likely babble in the absence of speech. Plot 200 illustrates an audio signal 202 output by a model (e.g., the speech synthesis model 160) that is silent except for periods 210 of babbling. These periods 210 are undesirable and will greatly reduce the quality of the communication between the users 12.

Figure 3:
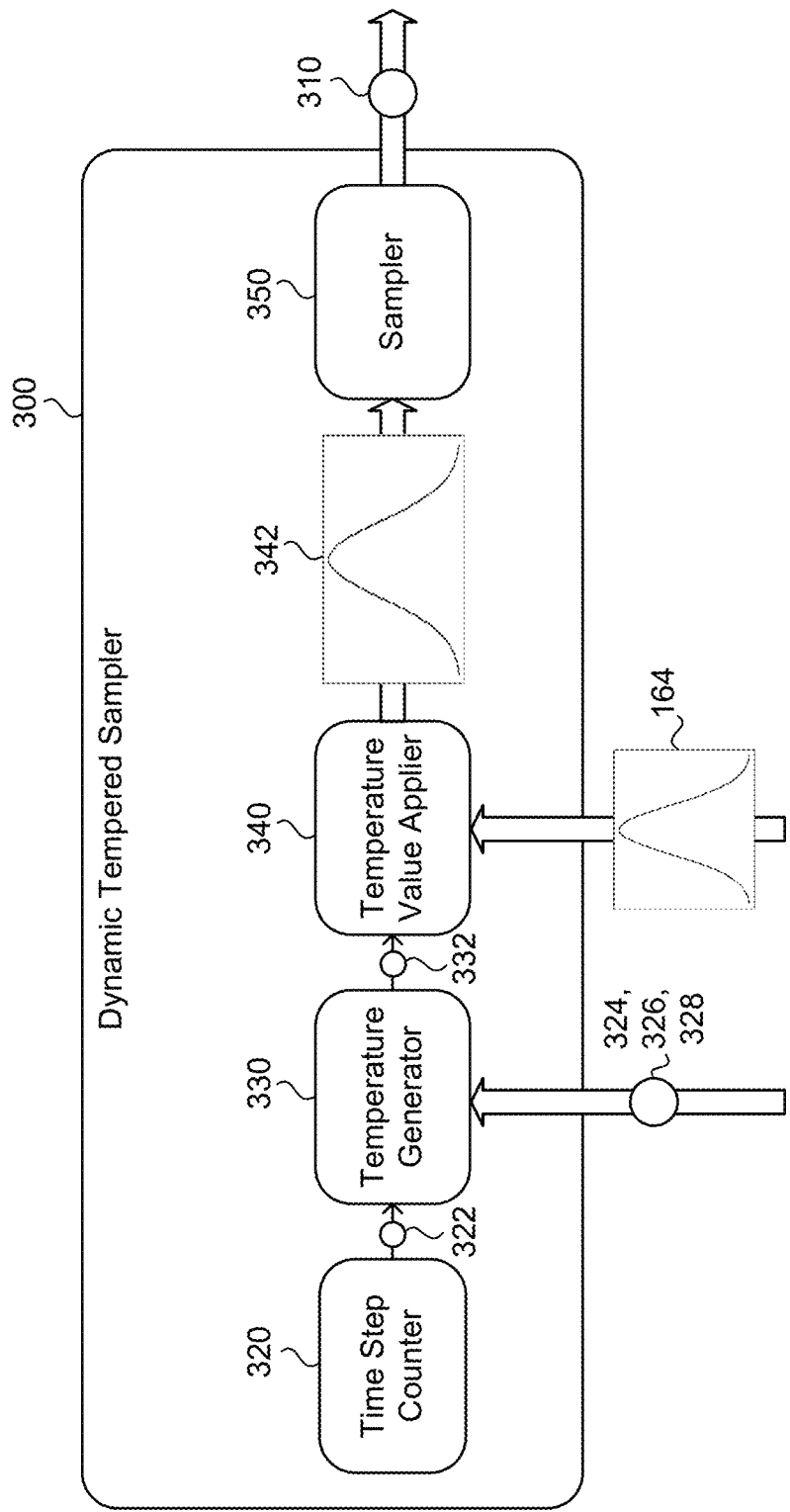
FIG. 3 is a schematic view of exemplary components of a dynamic tempered sampler.

Referring now to FIG. 3, to overcome the static temperature limitations, the dynamic tempered sampler 300 determines a temperature sampling value 332 based on a function of a number of time steps 322 in the plurality of time steps that precedes the current time step since the beginning of the packet loss concealment event. The temperature sampling value 332, as discussed in more detail below, is also based on an initial temperature sampling value 324, a minimum temperature sampling value 326, and a maximum temperature sampling value 328.

In some examples, a time step counter 320 counts or determines the number of time steps 322 that have elapsed since the start of the packet loss concealment event. For example, when the packet loss concealment event begins, the time step counter 320 will initialize with a count of zero (i.e., the number of time steps 322 is equal to zero), and increment the number of time steps 322 by one at the beginning of each subsequent time step. A temperature generator 330, in some implementations, receives the current number of time steps 322 from the time step counter 320 along with the initial temperature sampling value 324, the minimum temperature sampling value 326, and the maximum temperature sampling value 328. The initial, maximum, and minimum temperature sampling values 324, 326, 328 may be predetermined or adjusted based on parameters of the packet loss concealer 150 (e.g., amount of computing resources) or adjusted based on parameters of the audio communication between the users 12 (e.g., frequency of the audio signal, amplitude of the audio signal, etc.).

Figure 4:
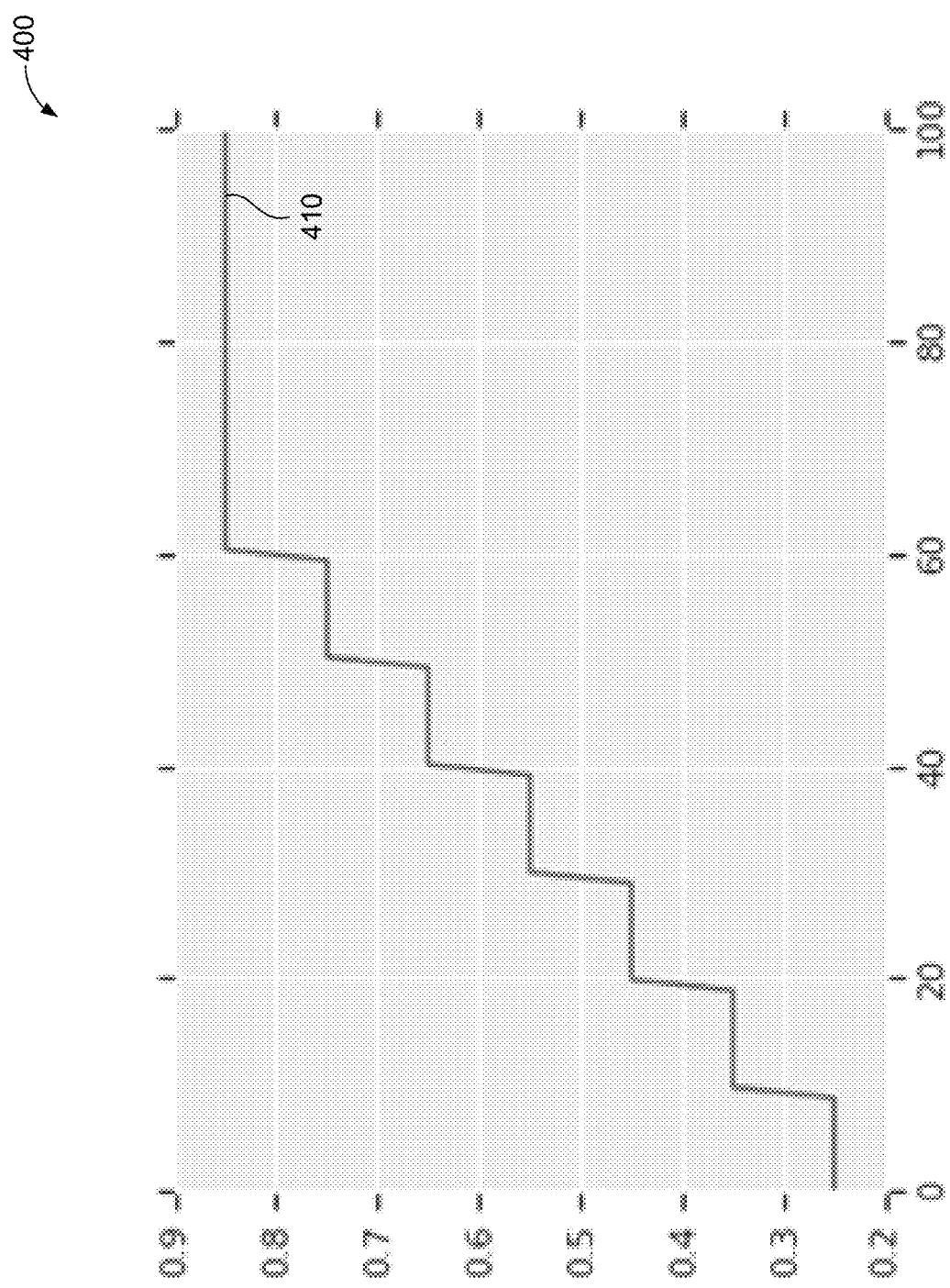
FIG. 4 is a schematic view of a plot of a linear function for increasing a sampling temperature value.

The temperature generator 330 may determine the temperature sampling value based on a function of the number of time steps 322 and the initial, maximum, and minimum temperature sampling values 324, 326, 328. In some examples, the function is a linear function. That is, in some implementations, the temperature generator 330 increases the temperature sampling value 332 based on the number of time steps 322 that preceded the current time step during the packet loss concealment event. A plot 400 of FIG. 4 illustrates an exemplary linear function 410 with an x-axis that represents the number of time steps 322 and a y-axis that represents the generated temperature sampling value 332. Here, the temperature generator 330, when the number of time steps satisfies a threshold, increases the temperature sampling value 332 by a set amount. For example, the threshold is a multiple of ten time steps and the set amount is 0.1. That is, in some implementations, the temperature generator 330 increases the temperature sampling value 332 by 0.1 every ten time steps.

The temperature generator 330 may initialize the temperature sampling value 332 to the initial temperature sampling value 324. The initial temperature sampling value 324 may be the same as the minimum temperature sampling value 326. For example, the minimum and the initial temperature sampling values 324, 326 may be 0.25. The plot 400 illustrates when the initial sampling value is 0.25. In this example, the temperature generator 330 initializes the temperature sampling value 332 to 0.25 and maintains the value of 0.25 for the first ten time steps. After the first ten time steps, the temperature generator 330 may increase the temperature sampling value 332 by 0.1 to a value of 0.35. The temperature generator 330 may continue to increase the temperature sampling value 332 by 0.1 every ten time steps until the temperature sampling value 332 reaches the maximum temperature sampling value 328. In some examples, the maximum temperature sampling value 328 is 0.85. Once the temperature sampling value 332 is equal to the maximum temperature sampling value 328, the temperature generator 330 may maintain the temperature sampling value 332 at the maximum temperature sampling value 328 until the conclusion of the packet loss concealment event.

The functions and values used herein are exemplary only, and it is understood that many different dynamic sampling temperature functions and values (e.g., initial, minimum, and maximum values 324, 326, 328, step size, etc.) may be used. For example, a quadratic function or an exponential function may be used instead of a linear function. The function may decrease the temperature sampling value as the number of samples increases. The function may be periodic. That is, the function may increase and decrease the temperature sampling value at different points.

With continued reference to FIG. 3, a temperature value applier 340 receives the generated temperature sampling value 332. The temperature value applier 340 also receives the probability distribution 164 for the current time step. The temperature value applier 340 applies the temperature sampling value 332 to the probability distribution 164 to adjust a probability of selecting or sampling possible output audio samples 22 from the probability distribution 164. That is, the temperature value applier 340 adjusts the probability distribution 164 based on the temperature sampling value 332 to generate an adjusted probability distribution 342.

Figure 5:
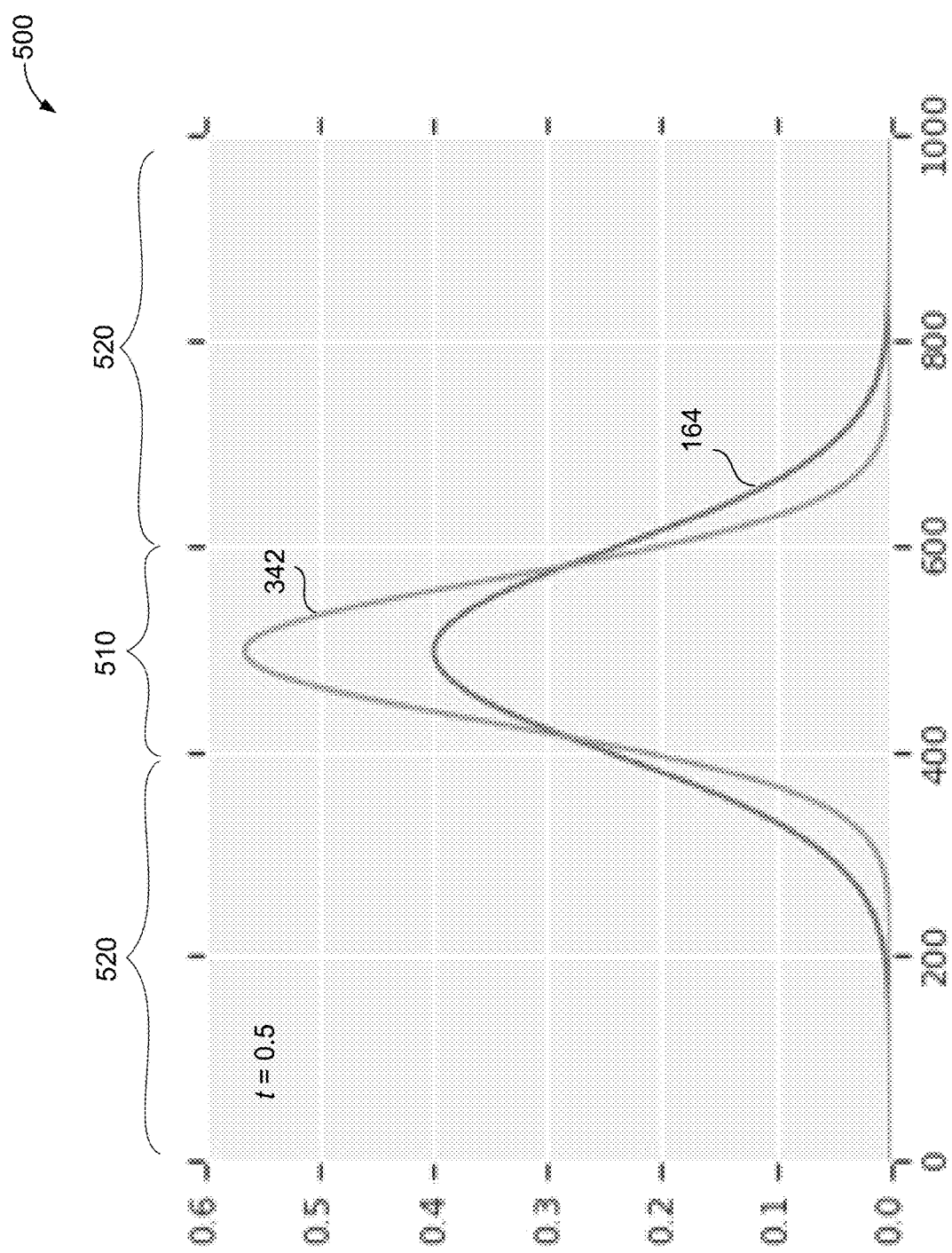
FIG. 5 is a schematic view of a plot of a probability distribution and an adjusted probability distribution.

A plot 500 of FIG. 5 illustrates an exemplary probability distribution 164 plotted simultaneously with an exemplary adjusted probability distribution 342 when the temperature sampling value (t) is equal to 0.5. Here, the x-axis represents possible output audio samples 22 and the y-axis represents a probability of the corresponding possible output audio sample 22 being sampled or randomly selected from the probability distribution 164, 342. Here, tempered sampling with the temperature sampling value (t) equal to 0.5 emphasizes areas 510 with a higher probability while reducing areas of lower probability 520. That is, areas with a high probability 510 in the probability distribution 164 (i.e., values approximately between 400 and 600 on the x-axis) have their respective probabilities increased in the adjusted probability distribution 342. Conversely, areas with a low probability 520 in the probability distribution 164 (i.e., values approximately lower than 400 and values greater than 600 on the x-axis) have their respective probabilities decreased in the adjusted probability distribution 342. As a result, areas of high probability 510 are even more likely to be randomly selected from the adjusted probability distribution 342 versus the probability distribution 164 and areas of low probability 520 are even less likely to be randomly selected from the adjusted probability distribution 342 versus the probability distribution 164.

Referring back to FIG. 3, the adjusted probability distribution 342 is passed to a sampler 350. The sampler 350 randomly selects one of the possible audio output samples 310 of the adjusted probability distribution 342 based on the corresponding probability for each possible audio output sample 310. That is, the probability of a select possible output audio sample 22 being randomly selected is based upon the adjusted probability associated with the respective possible output audio sample 22. Thus, a possible output audio sample 22 with a high probability has a high probability of being randomly selected by the sampler 350. The sampler 350 passes the randomly selected audio output sample 310 to the speech synthesizer 170 and also back to the speech synthesis model 160. The packet loss concealer 150 may continue to generate selected audio output samples 310 based on the sequence of previous output audio samples 22 and each previously generated selected audio output sample 310 until the completion of the packet loss concealment event.

The speech synthesis model 160, in some implementations, includes a conditioning network that translates a set of constraints (e.g., text) into new inputs for the speech synthesis model 160 in order to limit the model 160, during a packet loss concealment event, from continuing (i.e., predicting) with any possible speech and instead limit the model 160 to only continue the exact same phoneme as was interrupted when the packet loss concealment event started. A conditioning vector output from the conditioning network may be combined with the selected audio output sample 310 to produce a biasing effect of all of the layers of the model to direct the output of the model 160 to the correct speaker and words. In some examples, the conditioning network will be prohibited from evolving or updating its state during the during the packet loss concealment event and instead will be forced to repeat the same conditioning vectors. This, combined with limiting the number of selected audio output samples 310 before fading to silence (e.g., 130 milliseconds of selected audio output samples 310) may limit the packet loss concealer 150 from predicting the next phoneme in the communication between the user 12 and instead only complete the current phoneme.

Figure 6:
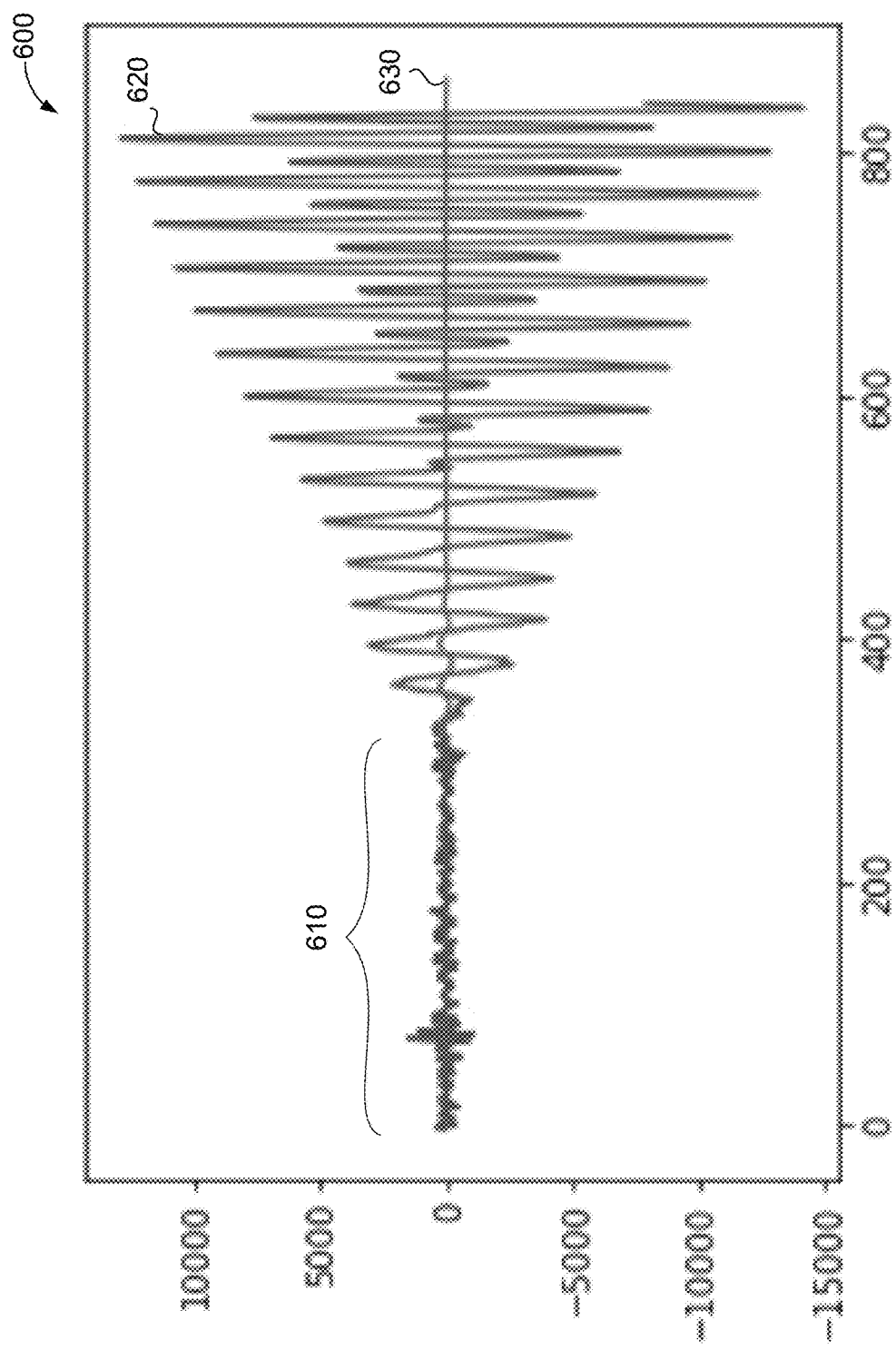
FIG. 6 is a schematic view of a plot of a constant sampling temperature output and a dynamic sampling temperature output in the absence of speech.
Figure 7:
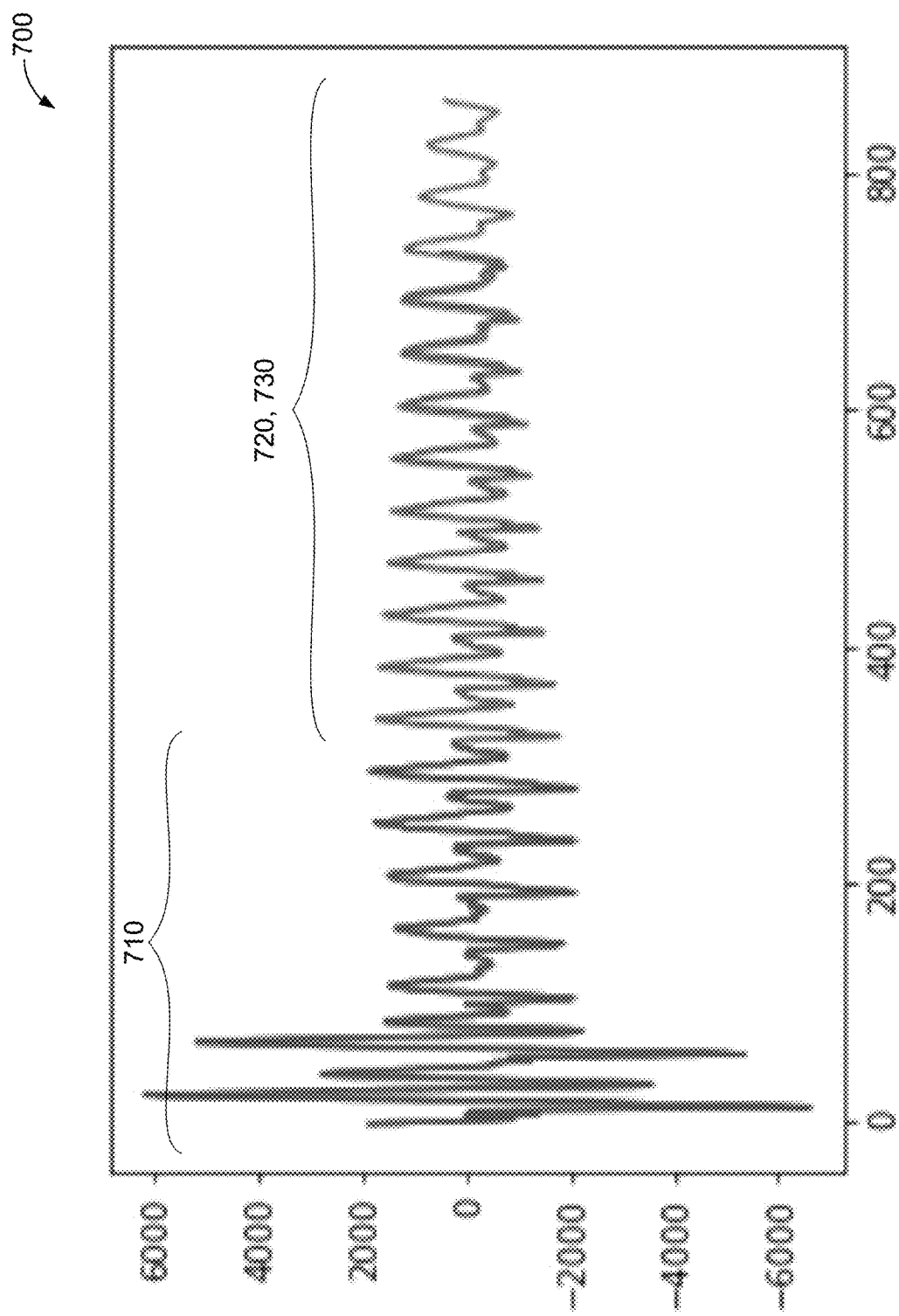
FIG. 7 is a schematic view of a plot of a constant sampling temperature output and a dynamic sampling temperature output in the presence of strongly conditioned speech.

Referring now to FIGS. 6 and 7, the dynamic tempered sampler 300 reduces the likelihood that the model 160 collapses to silence during speech and also simultaneously reduces the likelihood that the model 160 "babbles" (i.e., generates undesired speech) during absence of speech. A plot 600 of FIG. 6 illustrates a noisy priming signal 610 and an exemplary static or constant sampling temperature model output 620 and a dynamic sampling temperature model output 630. In this example, the x-axis represents the number of time steps while the y-axis represents amplitude of the signals 610, 620, 630. Here, the constant sampling temperature output 620 produces a high volume "babbling" (i.e., unexpected speech) while the dynamic sampling temperature model output 630 maintains the expected silence.

A plot 700 of FIG. 7 illustrates a strong speech signal 710 and an exemplary constant sampling temperature model output 720 and a dynamic sampling temperature model output 730. In this example, again the x-axis represents the number of time steps while the y-axis represents amplitude of the signals 710, 720, 730. Here, both the constant sampling temperature output 720 and the dynamic sampling temperature output 730 behave as desired and replicate the strongly conditioned speech signal.

Thus, the packet loss concealer 150 dynamically controls the sampling temperature value when sampling possible output audio samples during a packet loss concealment event. The willingness of a model to "talk" (i.e., predict outputs that are not silence) is based on two factors: the sampling temperature and the conditioning vector. The conditioning vector carries contextual information about the speech generated. The conditioning network may have a wider attention span than the speech synthesis model 160 and is thus able to bias the model into producing speech with the correct voice, phoneme, or even inflection. When conditioning is strong, then the conditioning bias allows the model to speak even with low sampling temperatures. On the contrary, when the conditioning is weak, the sampling temperature is much more critical to starting or stopping speech. Thus, a strong conditioning vector may be used to bias the model 160 to produce a skewed probability density function that is prone to talk or continue talking and even with low sampling temperatures, a strong conditioning vector may have the effect of producing speech.

A dynamic temperature balances these two factors. At the beginning of the packet loss concealment event, a low dynamic sampling temperature produces model collapse in presence of weak conditioning. Conversely, in the case of strong conditioning, the model does not collapse and instead continues generating speech. With weak conditioning, the model may have already collapsed and therefore is not able to recover the speech, no matter how much the sampling temperature is increased. Furthermore, a strong conditioned model will eventually collapse into silence. The higher the sampling temperature, the less likely this collapse will occur.

For that reason, a dynamic increase of sampling temperature minimizes unexpected speech and collapse to silence without requiring an analysis of the conditioning vector or any priming signal (i.e., the sequence of previous output audio samples 22). That is, the packet loss concealer 150 does not need to analyze the input history to determine whether there is speech or not, which may add significant complexity and the opportunity for additional errors. The dynamic tempered sampler 300 also does not require any changes in training for the speech synthesis model 160.

Examples herein are directed toward dynamically changing the sampling temperature of a packet loss concealer 150 during a packet loss concealment event. However, it is understood that dynamically changing the sampling temperature is applicable to other situations that include sampling from a probability density function as well. For example, dynamic temperature sampling may be used with generative models in general to improve outputs generated by the models.

Figure 8:
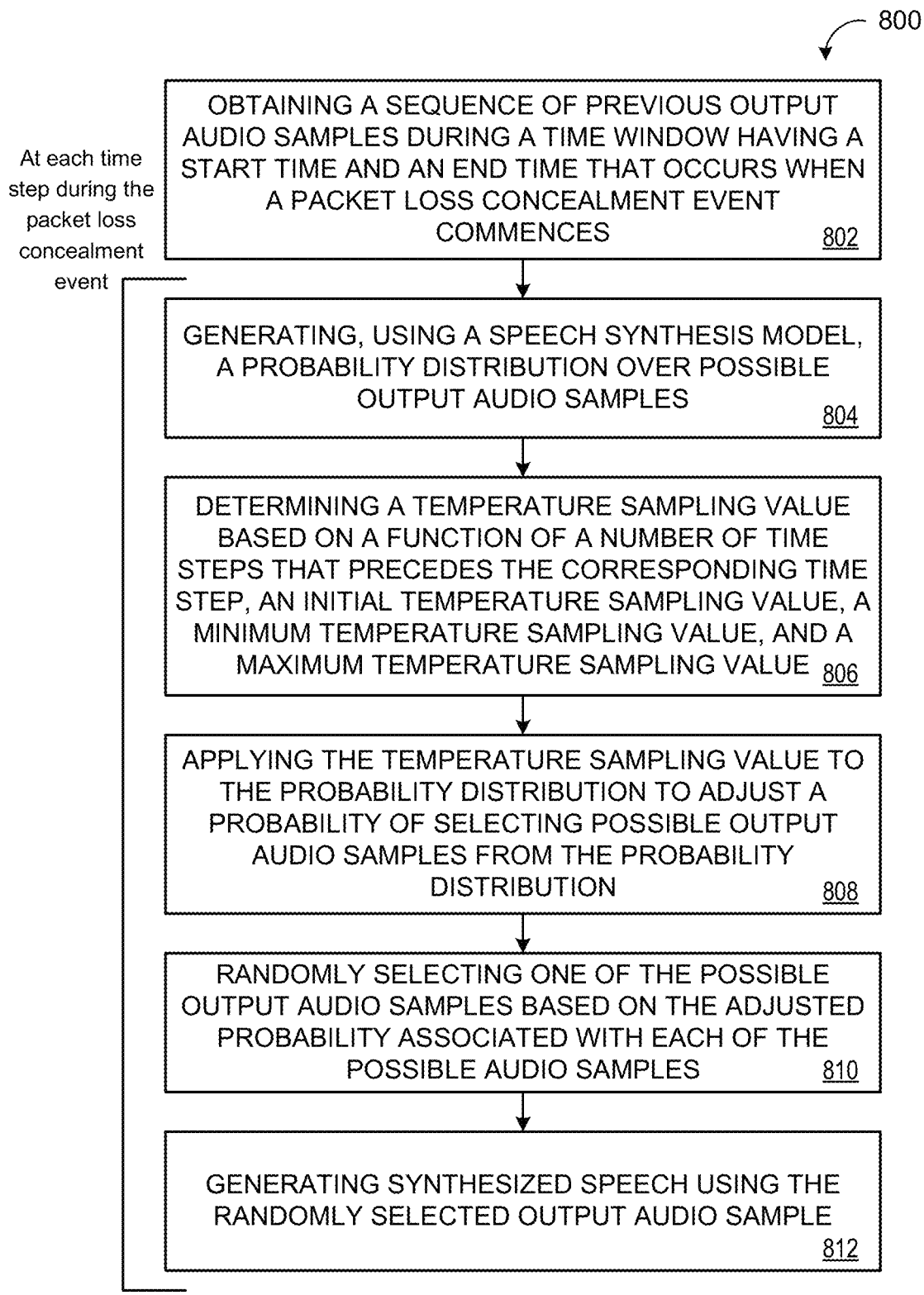
FIG. 8 is a flowchart of an example arrangement of operations for a method of sampling output audio samples.

FIG. 8 is a flowchart of an exemplary arrangement of operations for a method 800 of sampling output audio samples. The method 800 includes, during a packet loss concealment event in an active voice communication session, at step 802, obtaining, by data processing hardware 144, a sequence of previous output audio samples 22 during a time window having a start time and an end time. The end time occurs when the packet loss concealment event commences. At each time step of a plurality of time steps during the packet loss concealment event, the method 800 includes, at step 804, generating, by data processing hardware 144, using a speech synthesis model 160, a probability distribution 164 over possible output audio samples 22 for the corresponding time step. Each possible output audio sample 22 in the probability distribution includes a respective probability indicating a likelihood that the corresponding possible output audio sample 22 represents a portion of an utterance at the corresponding time step. The method, at step 806, includes determining, by the data processing hardware 144, a temperature sampling value 332 based on a function of a number of time steps 322 in the plurality of time steps that precedes the corresponding time step, an initial temperature sampling value 324, a minimum temperature sampling value 326, and a maximum temperature sampling value 328. The method, at step 808, includes applying, by the data processing hardware 144, the temperature sampling value 332 to the probability distribution 164 to adjust a probability of selecting possible output audio samples 22 from the probability distribution 164. At step 810, the method 800 includes randomly selecting, by the data processing hardware 144, one of the possible output audio samples 310 of the probability distribution 342 based on the adjusted probability associated with each of the possible audio samples 22. At step 812, the method 800 includes generating, by the data processing hardware 144, synthesized speech 172 using the randomly selected output audio sample 310.

Figure 9:
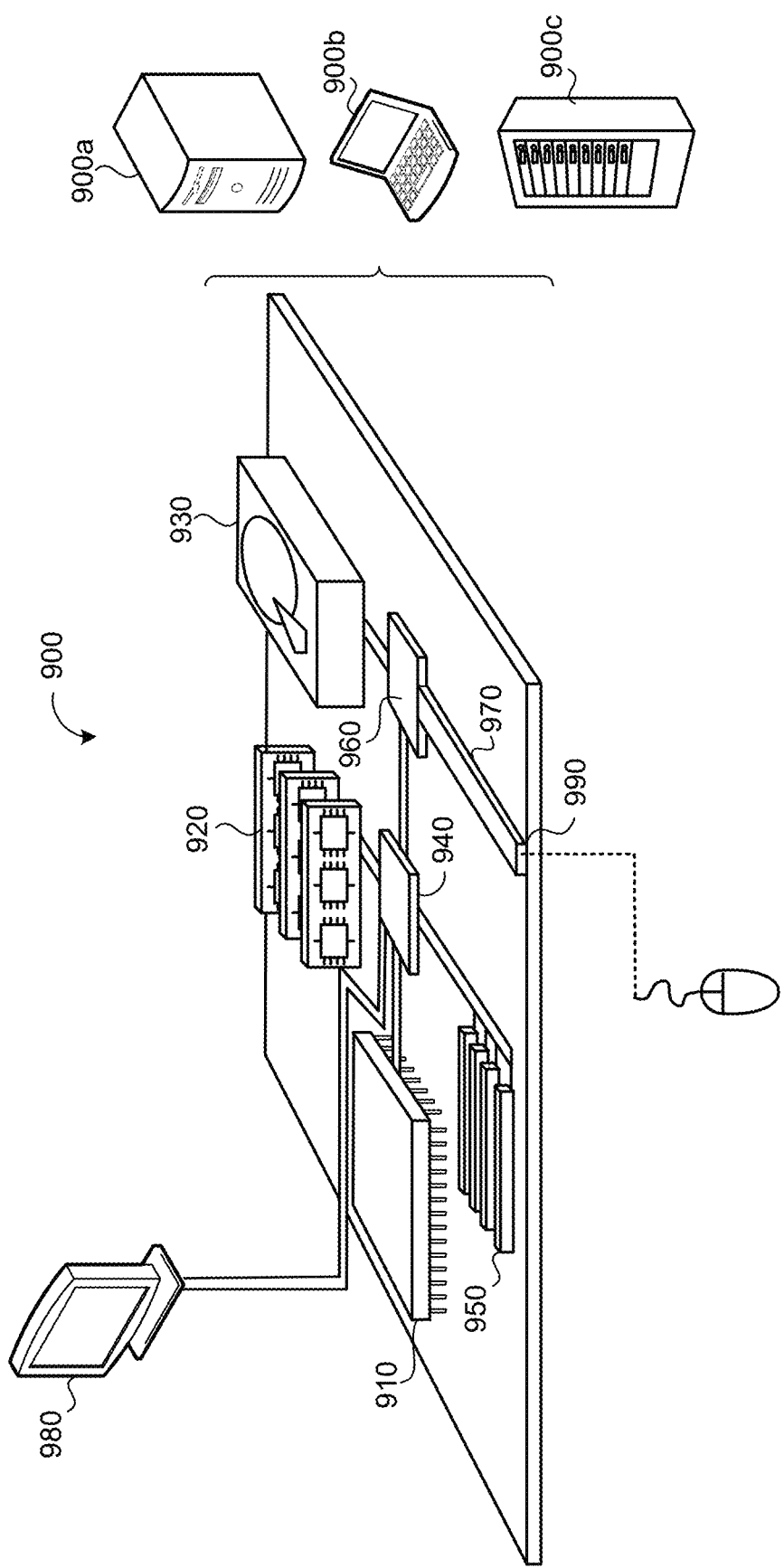
FIG. 9 is a schematic view of an example computing device that may be used to implement the systems and methods described herein.

FIG. 9 is schematic view of an example computing device 900 that may be used to implement the systems and methods described in this document. The computing device 900 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 900 includes a processor 910, memory 920, a storage device 930, a high-speed interface/controller 940 connecting to the memory 920 and high-speed expansion ports 950, and a low speed interface/controller 960 connecting to a low speed bus 970 and a storage device 930. Each of the components 910, 920, 930, 940, 950, and 960, are interconnected using various busses, and may be mounted on a common motherboard or in other manners as appropriate. The processor 910 can process instructions for execution within the computing device 900, including instructions stored in the memory 920 or on the storage device 930 to display graphical information for a graphical user interface (GUI) on an external input/output device, such as display 980 coupled to high speed interface 940. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 920 stores information non-transitorily within the computing device 900. The memory 920 may be a computer-readable medium, a volatile memory unit(s), or non-volatile memory unit(s). The non-transitory memory 920 may be physical devices used to store programs (e.g., sequences of instructions) or data (e.g., program state information) on a temporary or permanent basis for use by the computing device 900. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 930 is capable of providing mass storage for the computing device 900. In some implementations, the storage device 930 is a computer-readable medium. In various different implementations, the storage device 930 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 920, the storage device 930, or memory on processor 910.

The high speed controller 940 manages bandwidth-intensive operations for the computing device 900, while the low speed controller 960 manages lower bandwidth-intensive operations. Such allocation of duties is exemplary only. In some implementations, the high-speed controller 940 is coupled to the memory 920, the display 980 (e.g., through a graphics processor or accelerator), and to the high-speed expansion ports 950, which may accept various expansion cards (not shown). In some implementations, the low-speed controller 960 is coupled to the storage device 930 and a low-speed expansion port 990. The low-speed expansion port 990, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 900a or multiple times in a group of such servers 900a, as a laptop computer 900b, or as part of a rack server system 900c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executed by data processing hardware that causes the data processing hardware to perform operations comprising:
   during a packet loss concealment event in an active voice communication session:
   obtaining a sequence of previous output audio samples during a time window having a start time and an end time, the end time occurring when the packet loss concealment event commences; and
   at each time step of a plurality of time steps during the packet loss concealment event:
   generating, using a speech synthesis model, a probability distribution over possible output audio samples for the corresponding time step, each possible output audio sample in the probability distribution comprising a respective probability indicating a likelihood that the corresponding possible output audio sample represents a portion of an utterance at the corresponding time step;
   determining a dynamic temperature sampling value based on a function of a number of time steps in the plurality of time steps that precedes the corresponding time step, the dynamic temperature sampling value increasing as the number of time steps in the plurality of time steps preceded the corresponding time step during the packet loss concealment event increases;
   applying the dynamic temperature sampling value to the probability distribution to adjust a probability of selecting possible output audio samples from the probability distribution;
   selecting one of the possible output audio samples of the probability distribution based on the adjusted probability associated with each of the possible output audio samples; and
   generating synthesized speech using the selected output audio sample.

2. The method of claim 1, selecting one of the possible output audio samples of the probability distribution based on the adjusted probability associated with each of the possible output audio samples comprises a random selection.

3. The method of claim 1, wherein determining the dynamic temperature sampling value is further based on an initial temperature sampling value, a minimum temperature sampling value, and a maximum temperature sampling value.

4. The method of claim 3, wherein the maximum temperature sampling value is 0.85.

5. The method of claim 3, wherein the minimum temperature sampling value is 0.25.

6. The method of claim 3, wherein the initial temperature sampling value is the same as the minimum temperature sampling value.

7. The method of claim 1, wherein determining the dynamic temperature sampling value comprises:
   determining the number of time steps in the plurality of time steps that preceded the corresponding time step during the packet loss concealment event; and
   when the number of time steps satisfies a threshold, increasing the dynamic temperature sampling value by a set amount.

8. The method of claim 7, wherein the threshold a multiple of ten time steps.

9. The method of claim 7, wherein the set amount is 0.1.

10. The method of claim 1, wherein determining the dynamic temperature sampling value comprises increasing the dynamic temperature sampling value based on the number of time steps in the plurality of time steps preceded the corresponding time step during the packet loss concealment event.

11. A system comprising:
   data processing hardware; and
   memory hardware in communication with the data processing hardware, the memory hardware storing instructions that when executed on the data processing hardware cause the data processing hardware to perform operations comprising:
   during a packet loss concealment event in an active voice communication session:
   obtaining a sequence of previous output audio samples during a time window having a start time and an end time, the end time occurring when the packet loss concealment event commences; and
   at each time step of a plurality of time steps during the packet loss concealment event:
   generating, using a speech synthesis model, a probability distribution over possible output audio samples for the corresponding time step, each possible output audio sample in the probability distribution comprising a respective probability indicating a likelihood that the corresponding possible output audio sample represents a portion of an utterance at the corresponding time step;
   determining a dynamic temperature sampling value based on a function of a number of time steps in the plurality of time steps that precedes the corresponding time step, the dynamic temperature sampling value increasing as the number of time steps in the plurality of time steps preceded the corresponding time step during the packet loss concealment event increases;

applying the dynamic temperature sampling value to the probability distribution to adjust a probability of selecting possible output audio samples from the probability distribution;

selecting one of the possible output audio samples of the probability distribution based on the adjusted probability associated with each of the possible output audio samples; and generating synthesized speech using the selected output audio sample.

12. The system of claim 11, selecting one of the possible output audio samples of the probability distribution based on the adjusted probability associated with each of the possible output audio samples comprises a random selection.

13. The system of claim 11, wherein determining the dynamic temperature sampling value is further based on an initial temperature sampling value, a minimum temperature sampling value, and a maximum temperature sampling value.

14. The system of claim 13, wherein the maximum temperature sampling value is 0.85.

15. The system of claim 13, wherein the minimum temperature sampling value is 0.25.

16. The system of claim 13, wherein the initial temperature sampling value is the same as the minimum temperature sampling value.

17. The system of claim 11, wherein determining the dynamic temperature sampling value comprises:
   determining the number of time steps in the plurality of time steps that preceded the corresponding time step during the packet loss concealment event; and
   when the number of time steps satisfies a threshold, increasing the dynamic temperature sampling value by a set amount.

18. The system of claim 17, wherein the threshold a multiple of ten time steps.

19. The system of claim 17, wherein the set amount is 0.1.

20. The system of claim 11, wherein determining the dynamic temperature sampling value comprises increasing the dynamic temperature sampling value based on the number of time steps in the plurality of time steps preceded the corresponding time step during the packet loss concealment event.

* * * * *